United States Patent [19]

Henry

[11] Patent Number: 4,528,305

[45] Date of Patent: Jul. 9, 1985

[54] EPOXY RESIN MODELING STOCK

[75] Inventor: Rebecca D. Henry, Holt, Mich.

[73] Assignee: Ciba-Geigy Corporation, Ardsley, N.Y.

[21] Appl. No.: 599,879

[22] Filed: Apr. 13, 1984

[51] Int. Cl.³ .............................................. C08J 9/32
[52] U.S. Cl. .................................... 523/219; 521/54; 523/466; 523/468
[58] Field of Search ................ 525/504; 528/124; 523/444, 468, 466, 219; 521/54

[56] References Cited

U.S. PATENT DOCUMENTS

| 2,866,768 | 12/1958 | Bolstad | 528/124 |
|---|---|---|---|
| 3,384,610 | 5/1968 | Lee | 528/124 |
| 3,398,211 | 8/1968 | Remos | 528/124 |
| 3,409,591 | 11/1968 | Landua | 528/124 |
| 3,477,990 | 11/1969 | Dante et al. | 528/124 |
| 3,533,985 | 10/1970 | Lantz et al. | 528/124 |
| 3,538,039 | 11/1970 | Lantz et al. | 528/124 |
| 3,741,928 | 6/1973 | Solensky | 528/124 |
| 3,886,846 | 6/1975 | Bodine | |
| 3,954,650 | 5/1976 | Bliss | 528/124 |
| 4,101,459 | 7/1978 | Andrews | 528/124 |
| 4,182,832 | 1/1980 | Zondler | 528/124 |
| 4,366,108 | 12/1982 | Urech et al. | 528/124 |

Primary Examiner—Morton Foelak
Attorney, Agent, or Firm—Luther A. R. Hall

[57] ABSTRACT

Cured epoxy resin compositions, having a glass transition temperature (Tg) over 300° F. (149° C.) coupled with coefficients of linear thermal expansion (CTE) closely approaching those of aluminum, find practical utility in tooling applications as a modeling stock. The epoxy resin composition comprises one or more epoxy resins, one or more aromatic amine hardeners or a blend of aromatic and aliphatic amine hardeners, and a combination of at least three fillers selected from the group consisting of glass fibers, glass microspheres, graphite fibers and mica.

15 Claims, No Drawings

EPOXY RESIN MODELING STOCK

The instant invention pertains to cured epoxy resin compositions having a glass transition temperature (Tg) over 300° F. (149° C.) coupled with a low coefficient of thermal linear expansion (CTE) which are useful as modeling stock for computer aided design (CAD) and/or computer aided manufacture (CAM) applications especially at elevated temperatures.

BACKGROUND OF THE INVENTION

In order to be an acceptable modeling stock, a material must have such properties that its dimensions are essentially unchanged over a wide variation in environmental conditions (temperature, humidity) so that the dimensions of a workpiece made from such stock can meet the increasingly rigid specifications imposed by end-use considerations such as those of the aerospace industry.

Laminated wood modeling stock and plaster models would presumably have some advantage of cost and ease of working, but wood models made from such stock can swell and warp when exposed to adverse weather conditions, especially high temperature and humidity causing the parts and tools made from such wood models to be out of tolerance. Plaster models are fragile.

Metals, particularly aluminum, clearly overcome the problems associated with laminated wood modeling stock, but metal is relatively expensive, heavy and difficult as well as slow to machine to the desired shape. Nonetheless, a metal such as aluminum remains the standard modeling stock for preparing large workpieces of exact dimensions.

Attempts to overcome the problems associated with aluminum, have focused on hand lay-up epoxy laminate structures. These clearly have the disadvantages of being very costly and labor intensive in their construction requirements and not being adaptable to robotic construction coupled with the built-in inescapable flaws where adjoining edges of cloth in said laminates occur. These disadvantages would be exacerbated in the preparation of very large workpieces.

The instant invention leads to cured epoxy resin modeling stock which can be easily machined to exact dimensions with numerically controlled (computer aided) cutting equipment, or by standard hand techniques, can be used at high operating temperatures (over 300° F., 149° C.), and whose coefficient of linear thermal expansion closely approaches that of aluminum.

U.S. Pat. No. 3,886,846 describes a method of testing the accuracy of a cutting machine tool control program. This patent relates to the now common practice of preparing a "control program" by punched card, magnetic tape, computer disc or whatever, on a machine tool to make a prototype workpiece. The control program thus prepared is then available to control the preparation of such workpieces on any similar machine tool. The invention of U.S. Pat. No. 3,886,846 provides an inexpensive, easily machined, thermosetting plastic block as a working stock to test whether the control program applied to the machine tool to be used to manufacture the actual workpieces will in practice machine the working stock to the desired dimensions. This allows for great savings in time and expense in testing the control program. The thermosetting platic block is cast polyurethane foam or extended polyester which may be glued together with standard epoxy putty.

OBJECT OF THE INVENTION

The object of the instant invention is to provide a synthetic modeling material approaching aluminum in its coefficient of thermal linear expansion, but having the advantages of lower cost and lower density as well as lower energy required to heat to curing temperature. Other advantages include easier machining, easier repairs and easier engineering changes.

DETAILED DISCLOSURE

The instant invention pertains to cured epoxy resin compositions having a glass transition temperature (Tg) over 300° F. (149° C.) coupled with a low coefficient of thermal linear expansion (CTE) comprising (a) one or more epoxy resins, (b) one or more aromatic amine hardeners or a blend of aromatic and aliphatic amine hardeners, and (c) a combination of at least three fillers selected from the group consisting of glass fibers, glass microspheres, graphite fibers and mica.

The instant invention also relates to the uncured epoxy resin composition which when cured provides the Tg and CTE requirements noted above.

More particularly, the instant invention pertains to cured epoxy resin compositions having a glass transition temperature (Tg) over 300° F. (149° C.) coupled with a coefficient of thermal linear expansion (CTE) of less than $1.0 \times 10^{-5}$ in/in/°F. (or $1.8 \times 10^{-5}$ cm/cm/°C.) in the 75°–105° F. (24°–41° C.) range and of less than $1.9 \times 10^{-5}$ in/in/°F. (or $3.4 \times 10^{-5}$ cm/cm/°C.) in the 100°–350° F. (38°–177° C.) range, which comprises the cured product of (a) one or more epoxy resins, (b) one or more aromatic amine hardeners; or a mixture of said aromatic amine hardener or hardeners with up to 25% by weight of component (b) of an aliphatic amine hardener, wherein based on the total weight of components (a), (b) and (c), the % by weight of (a) plus (b) is from 80 to 50% by weight and the amount of component (b) is essentially that needed to provide one amine moiety for each epoxy moiety in component (a), and (c) from 20 to 50% by weight of at least three fillers selected from the group consisting of glass fibers, glass microspheres, graphite fibers and mica.

Preferably, based on the total weight of components (a), (b) and (c), the weight of components (a) plus (b) is from 75 to 68% by weight and the weight of component (c) is from 25 to 32% by weight.

Most preferably component (a) is from 64 to 46% by weight and component (b) is from 11 to 22% by weight of the total weight of components (a), (b) and (c).

In order to attain the object of this invention, a number of critical parameters must be met.

To meet the stringent requirements for coefficient of linear thermal expansion in the cured composition at elevated temperatures, the instant epoxy resin composition must also have a high Tg value. The uncured epoxy resin composition must also be liquid pourable for practical utility.

The glass transition temperature (Tg) of the cured epoxy resin compositions of this invention are over 300° F. (149° C.), preferably over 350° F. (177° C.).

To achieve such Tg values and to maintain a pourable composition, it is necessary to use one or more, preferably at least two, epoxy resins as component (a).

Since the liquid epoxy resin, 2,2-bis(p-glycidyloxyphenyl)propane, cured with aliphatic amines has a Tg value of about 250° F. (121° C.), it is indicated that the epoxy resin component (a) contain a large proportion of multifunctional (more than two) epoxy resins, and that the amine hardeners contain a large proportion of aromatic amines.

When the epoxy resin component (a) has a large proportion of multifunctional epoxy resins; and when the amine hardener component (b) has a large proportion of aromatic amines, the cured epoxy resin compositions do have Tg values over 300° F. (149° C.). Values of Tg well over 350° F. (177° C.) can be obtained.

While having a Tg over 300° F. (149° C.) is required, it is not sufficient to attain the low coefficient of thermal linear expansion values (CTE) needed to meet the object of this invention.

The judicious addition of selected fillers to the epoxy resin composition is needed to achieve the level of CTE values similar to those for aluminum.

While very high concentrations (39% by weight) of mica alone gives CTE values in the desired range, it is at the cost of increased density of the epoxy resin composition and at some sacrifice in tractability of said composition.

The use of a mixture of at least three fillers selected from the group consisting of glass fibers, glass microspheres, graphite fibers and mica leads to very low CTE values at a much lower total concentration of fillers in the composition with the composition remaining very pourable. The combination of the three fillers together gives much lower CTE values than the use of one or two such fillers at the same total filler concentration indicating that there is an unexpected benefit to be attained by use of the combination of the instant fillers.

The epoxy resins of component (a) are liquid or semi-solid at room temperature. If a single epoxy resin is used, it must be multifunctional (more than two glycidyl groups per molecule). It two or more epoxy resins are used, a portion of component (a) may be the difunctional epoxy resin, 2,2-bis(p-glycidyloxyphenyl)propane, 1,4-diglycidyloxybutane or 4-vinyl-1-cyclohexene dioxide.

Examples of epoxy resins which may be used in component (a) are 2,2-bis(p-glycidyloxyphenyl)propane (available as ARALDITE 6010, CIBA-GEIGY, epoxy value 0.52–0.55 eq./100 grams or as ARALDITE 7072, CIBA-GEIGY, epoxy value 0.143–0.182 eq/100 grams); 1,4-diglycidyloxybutane (available as ARALDITE RD-2, CIBA-GEIGY); 4-vinyl-1-cyclohexene dioxide (available as ARALDITE RD-4, CIBA-GEIGY); epoxy phenol novolac (available as EPN 1138, epoxy value 0.55–0.57 eq/100 grams; or as EPN 1139, epoxy value 0.56–0.58 eq/100 grams, from CIBA-GEIGY); N,N,O-triglycidyl-p-aminophenol (available as Epoxy Resin 0500 from CIBA-GEIGY); N,N,N',N'-tetraglycidyl-4,4'-diaminodiphenylmethane (available as ARALDITE MY 720 from CIBA-GEIGY); and 1,1,2,2-tetrakis(p-glycidyoxyphenyl)-ethane.

Preferably the epoxy resins useful in component (a) are 2,2-bis(p-glycidyloxyphenyl)propane, 4-vinyl-1-cyclohexene dioxide, epoxy phenol novolac and N,N,N',N'-tetraglycidyl-4,4'-diaminodiphenylmethane.

Preferably, two or more epoxy resins are used in component (a) with a combination of epoxy phenol novolac, 4-vinyl-1-cyclohexene dioxide and N,N,N',N'-tetraglycidyl-4,4'-diaminodiphenylmethane being particularly preferred.

The amine hardeners of component (b) may be one or more aromatic amines or a blend of aromatic and aliphatic amine hardeners.

The aromatic amine hardeners provide the structural elements needed to achieve a cured epoxy resin component with the requisite high Tg value. However, the aromatic amines are themselves solids and tend to be sluggish in the ultimate curing reaction.

While such aromatic amine hardeners can be used alone in the instant compositions, by dissolving them in the liquid epoxy resin, where speed of ultimate curing is not critical, it is preferable to combine the aromatic amine hardener with a liquid aliphatic hardener which will not only facilitate liquefaction of the solid aromatic amines in the composition, but also accelerate the curing (gelation) of the final composition at ambient temperatures when final curing is desired.

Examples of the aromatic amines which may be used as component (b) are 4,4'-methylenedianiline, diethyltoluenediamine, m-phenylenediamine, 2,4-bis(p-aminobenzyl)aniline and 4,4'-diaminophenyl sulfone. Preferably the aromatic amine hardeners are a combination of 4,4'-methylenedianiline, diethyltoluenediamine, m-phenylene-diamine and 2,4-bis(p-aminobenzyl)aniline.

Examples of the liquid aliphatic amines which may be used in component (b) are triethylenetetramine, diethylenetriamine, tetraethylenepentamine, 3-diethylaminopropylamine and 3,3'-iminobispropylamine. Preferably the aliphatic amine is triethylenetetramine.

The instant fillers of component (c) are all materials which are essentially not affected by moisture.

Graphite fibers, of lower density, are preferred over glass fibers. The graphite fibers are derived from pitch or polyacrylonitrile.

Mica may be acicular, muscovite or suzorite. Preferably acicular mica is used since it is easier to blend in the epoxy resin composition at higher levels.

Glass microspheres may be hollow or solid. Preferably hollow glass microspheres are used since they facilitate easier machining of the ultimate cured epoxy resin modeling stock and lead to reduced density (lower weight of filler) in the epoxy resin composition.

The preferred fillers are a combination of graphite fibers, acicular mica and hollow glass microspheres in roughly a 1:2:1 weight ratio.

The instant compositions may also include minor amounts of processing aids such as wetting agents, defoaming agents and the like. These are present only in such quantity as to assist in the preparation of the instant compositions. Their presence in such low concentration does not adversely affect the Tg and CTE values obtained with the cured epoxy resin compositions of this invention.

CTE values are given in in/in/°F. (or cm/cm/°C.) units. This coefficient value indicates the amount in inches (or centimeters) that the cured resin composition expands per inch (or centimeter) of molded stock for each degree Fahrenheit (or Centigrade) the temperature is raised. Clearly low CTE values are desired.

In order to meet the overall requirements for an acceptable cured epoxy resin modeling stock, the cured composition should have a Tg value over 300° F. (149° C.), preferably over 350° F. (177° C.), and a CTE value of less than $1.0 \times 10^{-5}$ in/in/°F. (or $1.8 \times 10^{-5}$ cm/cm/°C.) in the 75°–105° F. (24°–41° C.) range; and a CTE value of less than $1.9 \times 10^{-5}$ in/in/°F. (or $3.4 \times 10^{-5}$ cm/cm/°C.) in the 100°–350° F. (38°–177° C.) range.

The CTE value for modeling stock from aluminum and from hand lay-up graphite cloth epoxy laminates are about $1.3 \times 10^{-5}$ in/in/°F. ($2.3 \times 10^{-5}$ cm/cm/°C.) and $1.0$-$1.5 \times 10^{-6}$ /in/in/°F. ($1.8$-$2.7 \times 10^{-6}$ cm/cm/°C.) respectively in the 100°–350° F. (38°–177° C.) range. The CTE values obtained with the cured epoxy resin compositions of this invention closely approach the CTE values of aluminum.

The following examples are presented for the purpose of illustration only and are not to be construed to limit the nature or scope of the instant invention in any manner whatsoever.

EXAMPLE 1

Preparation of Epoxy Resin Composition a. Epoxy Resin Mixture

When more than one epoxy resin is to be used, a mixture of the epoxy resins is first prepared by stirring the resins in a closed vessel. The resins are warmed to a temperature up to 180° F. (82° C.) to facilitate mixing by reducing the solution viscosity. The blend of resins is then cooled to room temperature to give a liquid mixture of the desired epoxy resins.

b. Amine Hardener Mixture

A mixture of aromatic and aliphatic amines is generally used. The aromatic amine (one or more), a low melting solid, is first melted and then the aliphatic amine hardener, a liquid, is added to give a liquid mixture of amine hardeners.

c. Epoxy Resin Composition

To a vessel, fitted with a stirrer and capable of being subjected to reduced pressure, is added the stirred epoxy resin mixture from (a) along with a wetting agent and defoaming agent to aid in the subsequent incorporation of the fillers into the resin. The fillers are now added sequentially into the resin. Mica is added first followed by the glass microspheres and finally the fibers or alternatively by the fibers and finally the microspheres. The mixture has warmed up slightly due to the internal heat generated by the frictional forces caused by stirring the filler into the resin blend. The mixture at this point is a soft paste.

The liquid hardener mixture from (b) is now added with good stirring to the mixture of resin and filler at about 130° F. (54° C.). Stirring is continued till the composition becomes uniformly mixed. Reduced pressure (635 mm Hg) is imposed on the vessel to remove any trapped air within the liquid composition. The temperature of the liquid composition rises to about 135° F. (57° C.) due to the stirring. The vacuum is now released and the liquid epoxy resin composition is ready for curing.

EXAMPLE 2

Curing of Epoxy Resin Composition

The liquid epoxy resin composition prepared in Example 1 is poured into an appropriate mold. The mold is held at room temperature for overnight and the composition gels in the mold.

Curing of the gelled composition in the mold is then carried out using either a step-wise cure schedule listed below or alternatively using a continuously increasing temperature profile over essentially the same time (8 hours) to the same final temperature (375° F., 191° C.).

A typical step-wise cure schedule involves holding the mold for 2 hours at 150° F. (66° C.)
1.5 hours at 200° F. (93° C.)
1.5 hours at 300° F. (149° C.)
3 hours at 375° F. (191° C.)

When the cure schedule is complete, the cured composition is allowed to cool gradually to room temperature in the mold. The cured composition has the requisite glass transition temperature (Tg) and coefficient of thermal linear expansion (CTE) to be suitable for use in modeling stock.

The Tg values are determined on a Perkin-Elmer Thermomechanical Analyzer.

The CTE values in the temperature range 75°–105° F. (24°–41° C.), which are used for screening purposes, are obtained using a fused quartz-tube dilatometer using the general procedure of ASTM D-696.

The CTE values at the elevated temperature range (100°–250° F. or 100°–350° F.; 38°–121° C. or 38°–177° C.) are also obtained using the Perkin-Elmer Thermomechanical Analyzer.

EXAMPLE 3

Using the general procedures of Examples 1 and 2, an epoxy resin composition having the following components is prepared and cured.

| Components | Composition A<br>Parts by Weight |
|---|---|
| epoxy phenol novolac (EPN 1138) | 33.20 |
| 4-vinyl-1-cyclohexene dioxide | 14.23 |
| N,N,N',N'—tetraglycidyl-4,4'-methylenedianiline | 8.37 |
| m-phenylenediamine | 6.90 |
| 4,4'-methylenedianiline | 4.65 |
| 2,4-bis(p-aminobenzyl)-aniline | 1.95 |
| triethylenetetramine | 1.50 |
| acicular mica | 14.00 |
| milled graphite fibers | 7.00 |
| hollow glass microspheres | 7.00 |
| wetting agent | 0.60 |
| defoaming agent | 0.60 |

The Tg of this composition after curing is 365° F. (185° C.).

The CTE value at 75°–105° F. (24°–41° C.) range is $0.89 \times 10^{-5}$ in/in/°F. ($1.6 \times 10^{-5}$ cm/cm/°C.).

The CTE value at 100°–350° F. (38°–177° C.) range is $1.6 \times 10^{-5}$ in/in/°F. ($2.9 \times 10^{-5}$ cm/cm/°C.).

EXAMPLE 4

Two other typical compositions are prepared and cured as described in Examples 1–3.

| Components | Composition B<br>parts by weight | Composition C<br>parts by weight |
|---|---|---|
| epoxy phenol novolac (EPN 1138) | 25.06 | 32.25 |
| 2,2-bis(p-glycidyloxyphenyl)-propane (ARALDITE 7072) | 10.27 | — |
| 4-vinyl-1-cyclohexene dioxide | 18.49 | 16.52 |
| N,N,N',N'—tetraglycidyl-4,4'-methylenedianiline | — | 8.13 |
| m-phenylenediamine | 6.38 | 7.22 |
| 4,4'-methylenedianiline | 4.30 | 4.87 |

-continued

| Components | Composition B parts by weight | Composition C parts by weight |
|---|---|---|
| 2,4-bis(p-aminobenzyl)-aniline | 1.80 | 2.04 |
| triethylenetetramine | 1.39 | 1.57 |
| acicular mica | 12.84 | 13.60 |
| milled graphite fibers | — | 6.80 |
| milled glass fibers | 12.84 | — |
| hollow glass microspheres | 6.42 | 6.80 |
| wetting agent | 0.10 | 0.10 |
| defoaming agent | 0.10 | 0.10 |
| Tg | 300–320° F. (149–160° C.) | |
| CTE in/in°F. (cm/cm/°C.) at 75–105° F. (24–41° C.) | $1.18 \times 10^{-5}$ ($2.12 \times 10^{-5}$) | $0.95 \times 10^{-5}$ ($1.7 \times 10^{-5}$) |
| at 100–250° F. (38–121° C.) 1.9–2.1 × 10⁻⁵ | — | ($3.4$–$3.8 \times 10^{-5}$) |

EXAMPLE 5

Effect of Filler on CTE Values (a) Compositions having the resin/hardener combination similar to that of Composition B are compared using a variety of different fillers and combinations thereof to ascertain the effect of filler concentration and type of the CTE values at the 75°–105° F. (24°–41° C.) range.

| Composition | Filler (weight %) | CTE in/in/°F. | (cm/cm/°C.) |
|---|---|---|---|
| CC | none | $2.4 \times 10^{-5}$ | ($4.3 \times 10^{-5}$) |
| D | mica (23.1) | $1.9 \times 10^{-5}$ | ($3.4 \times 10^{-5}$) |
| E | mica (14.3 plus glass fibers (14.3) | $1.9 \times 10^{-5}$ | ($3.4 \times 10^{-5}$) |
| F | hollow glass microspheres (13.8) | $1.8 \times 10^{-5}$ | ($3.2 \times 10^{-5}$) |
| G | glass fibers (42.1) | $1.7 \times 10^{-5}$ | ($3.1 \times 10^{-5}$) |
| H | glass fibers (12.9) plus hollow glass microspheres (6.5) | $1.6 \times 10^{-5}$ | ($2.9 \times 10^{-5}$) |
| I | mica (39.0) | $1.1 \times 10^{-5}$ | ($2.0 \times 10^{-5}$) |
| J | mica (13.5) plus glass fibers (13.5) plus hollow glass microspheres (5.4) | $1.1 \times 10^{-5}$ | ($2.0 \times 10^{-5}$) |

Inspection of these CTE values indicates that, while a high loading of mica can lead to low CTE values, a lower weight percent of three fillers together can achieve the same level of CTE values with the concomitant reduction in weight of the cured epoxy resin workpiece, a clear advantage.

(b) Other compositions having the resin/hardener combination similar to that of Composition C are compared as well with a variety of fillers to ascertain the effect of filler concentration and type on the CTE values at the 75°–105° F. (24°–41° C.) range.

| Composition | Filler (weight %) | CTE in/in/°F. | (cm/cm/°C.) |
|---|---|---|---|
| K | none | $2.2 \times 10^{-5}$ | ($4.0 \times 10^{-5}$) |
| L | lithium aluminum silicate* (48.9) | $1.38 \times 10^{-5}$ | ($2.5 \times 10^{-5}$) |
| M | mica (49.3) | $1.32 \times 10^{-5}$ | ($2.4 \times 10^{-5}$) |
| N | graphite fiber (13.6) | $1.17 \times 10^{-5}$ | ($2.1 \times 10^{-5}$) |
| O | mica (21.2) plus graphite fibers (9.9) | $1.0 \times 10^{-5}$ $0.89 \times 10^{-5}$ | ($1.8 \times 10^{-5}$) ($1.6 \times 10^{-5}$) |
| P, Q | mica (14.1) plus graphite fibers (7.0) plus hollow glass microspheres (7.0) | $0.83 \times 10^{-5}$ | ($1.5 \times 10^{-5}$) |

*this filler has a negative CTE value, $-0.47 \times 10^{-5}$ ($-0.85 \times 10^{-5}$)

Inspection of these CTE values shows that lithium aluminum silicate inspite of its negative CTE value per se is much less effective as a filler than the combination of fillers of composition P or Q, even at barely over half the loading of Composition L.

Graphite fibers are more effective fillers than glass fibers.

Compositions P and Q are essentially duplicate runs and the CTE values are nearly the same.

What is claimed is:

1. A cured epoxy resin composition having a glass transition temperature (Tg) over 300° F. (149° C.) coupled with a coefficient of thermal linear expansion (CTE) of less than $1.0 \times 10^{-5}$ in/in/°F. (or $1.8 \times 10^{-5}$ cm/cm/°C.) in the 75°–105° F. (24°–41° C.) range and of less than $1.9 \times 10^{-5}$ in/in/°F. (or $3.4 \times 10^{-5}$ cm/cm/°C.) in the 100°–350° F. (38°–177° C.) range, which comprisels the cured product of
   (a) one or more epoxy resins,
   (b) one or more aromatic amine hardeners; or a mixture of said aromatic amine hardener or hardeners with up to 25% by weight of component (b) of an aliphatic amine hardener, wherein based on the total weight of components (a), (b) and (c), the % by weight of (a) plus (b) is from 80 to 50% by weight and the amount of component (b) is essentially that needed provide one amine moiety for each epoxy moiety in component (a), and
   (c) from 20 to 50% by weight of at least three fillers selected from the group consisting of glass fibers, glass microspheres, graphite fibers and mica in proportions roughly of 2:1:1:2, respectively.

2. A composition according to claim 1 wherein the weight of components (a) plus (b) is from 75 to 68% by weight, based on the total weight of components (a), (b) and (c), and the weight of component (c) is from 25 to 32% by weight.

3. A composition according to claim 2 wherein component (a) is from 64 to 46% by weight and component (b) is from 11 to 22% by weight of the total weight of components (a), (b) and (c).

4. A composition according to claim 1 having a Tg value of over 350° F. (177° C.).

5. A composition according to claim 1 wherein the epoxy resin of component (a) is one or more of 2,2-bis(p-glycidyloxyphenyl)propane, epoxy phenol novolac, 1,4-diglycidyloxybutane, 4-vinyl-1-cyclohexene dioxide, N,N,O-triglycidyl-p-aminophenol, N,N,N',N'-tetraglycidyl-4,4'-diaminodiphenylmethane or 1,1,2,2-tetrakis(p-glycidyloxyphenyl)ethane.

6. A composition according to claim 5 wherein the epoxy resin of component (a) is one or more of 2,2-bis(p-glycidyloxyphenyl)propane, epoxy phenol novolac, 4-vinyl-1-cyclohexene dioxide or N,N,N',N'-tetraglycidyl-4,4'-diaminodiphenylmethane.

7. A composition according to claim 6 wherein component (a) is a combination of epoxy phenol novolac, 4-vinyl-1-cyclohexene dioxide and N,N,N',N'-tetraglycidyl-4,4'-diaminodiphenylmethane.

8. A composition according to claim 1 wherein the aromatic amine hardener of component (b) is one or more of 4,4'-methylenedianiline, diethyltoluenediamine, m-phenylenediamine, 2,4-bis(p-aminobenzyl)aniline or 4,4'-diaminodiphenyl sulfone.

9. A composition according to claim 8 wherein the aromatic amine hardeners of component (b) are a combination of 4,4'-methylenedianiline, diethyltoluenediamine, m-phenylenediamine and 2,4-bis(p-aminobenzyl)aniline.

10. A composition according to claim 1 wherein the aliphatic amine hardener of component (b) is triethylenetetramine, diethylenetriamine, tetraethylenepentamine, 3-diethylaminopropylamine or 3,3'-iminobispropylamine.

11. A composition according to claim 10 wherein the hardener is triethylenetetramine.

12. A composition according to claim 1 wherein the glass microspheres of component (c) are hollow.

13. A composition according to claim 1 wherein the mica of component (c) is acicular.

14. A composition according to claim 1 wherein the fillers of component (c) are a combination of graphite fibers, acicular mica and hollow glass microspheres in a roughly 1:2:1 weight ratio.

15. An uncured epoxy resin composition having the components of the composition according to claim 1 which when cured gives a Tg and CTE values of the composition according to claim 1.

* * * * *